June 30, 1936. R. O. HELGEBY 2,046,163
SPEEDOMETER
Filed Jan. 2, 1932 2 Sheets-Sheet 1
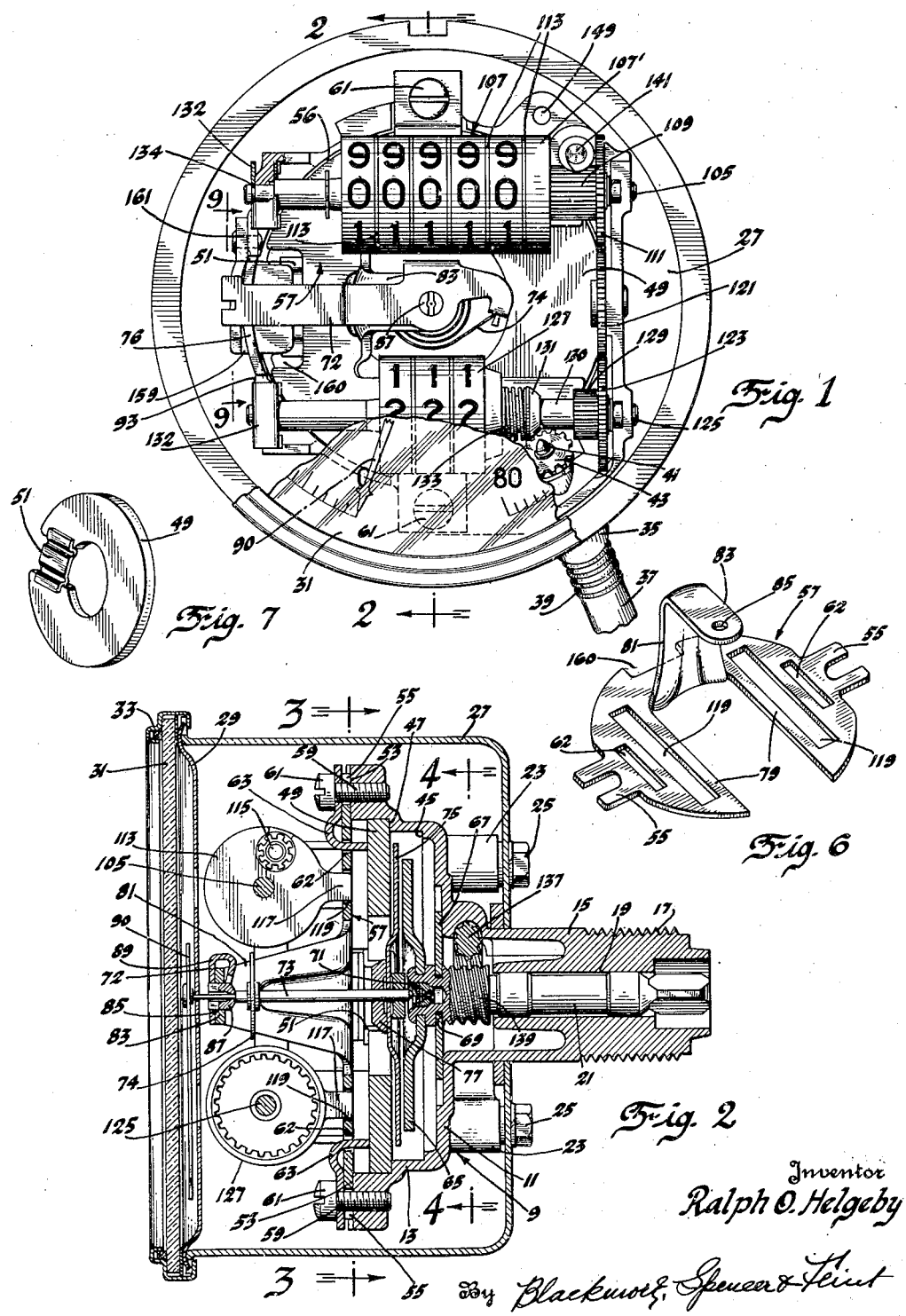
Inventor
Ralph O. Helgeby
By Blackmore, Spencer & Feint
Attorneys

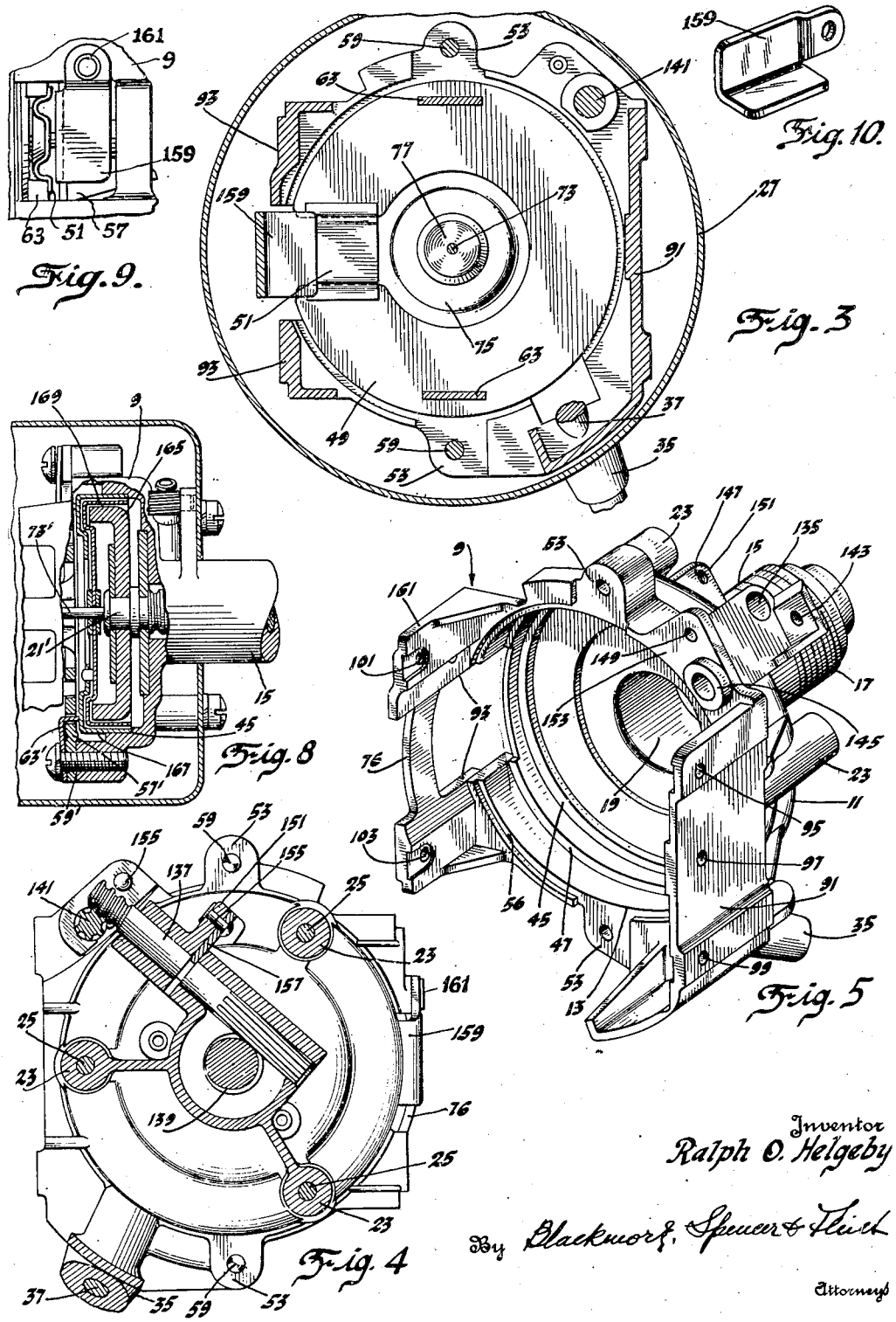

Patented June 30, 1936

2,046,163

UNITED STATES PATENT OFFICE 2,046,163

SPEEDOMETER

Ralph O. Helgeby, Flint, Mich., assignor, by mesne assignments, to General Motors Corporation, Detroit, Mich., a corporation of Delaware Application January 2, 1932, Serial No. 584,369

2 Claims. (Cl. 264—13)

This invention relates to measuring instruments and has been designed as an improvement in a combined speed and distance-recording instrument for vehicles.

An object of the invention is to provide such an instrument with an improved main frame.

Another object is the provision of an improved spindle-supporting frame.

As another object the invention provides a novel driving mechanism from the rotor shaft to the odometer mechanism.

Still another object is the provision of a main frame adapted for use with a stationary magnet or with a rotating magnet.

Other objects and advantages will appear from the following description.

Accompanying the description are drawings in which—

Fig. 1 is a view in front elevation partly broken away of my improved instrument.

Fig. 2 is a section on line 2—2 of Fig. 1.

Fig. 3 is a section on line 3—3 of Fig. 2.

Fig. 4 is a section on line 4—4 of Fig. 2.

Fig. 5 is a view in perspective of the main frame.

Fig. 6 is a perspective of the spindle frame.

Fig. 7 is a perspective of the magnet with the temperature compensator assembled therewith.

Fig. 8 is a view partly in side elevation and partly broken away and in section of a modification using a rotary magnet instead of the fixed magnet used with the form of the invention shown in the other figures.

Fig. 9 is a view as seen from line 9—9 of Fig. 1.

Fig. 10 is a perspective of a compensator.

Referring by reference characters to the drawings, numeral 9 represents the main frame, this frame being preferably formed by die casting. The present invention is largely concerned with an improvement in this main frame. In the past such frames have been made of cup shape for supporting a magnet and with an axial aperture in the bottom of the cup for the rotor shaft. The rotation of this shaft rotates the rotor member relatively to the magnet. With such prior main frames there has been associated a stamped frame carrying odometer wheels and having an arm overlying the instrument provided with a bearing in axial alignment with the rotor shaft, this bearing cooperating with a bearing at the end of the rotor shaft for the spindle of the speed indicator mechanism. It has been found that it is better to support the shafts for the distance-indicating mechanism on parts of the die cast frame rather than on the separate stamped frame as heretofore. When so supported there may be used a light and inexpensive stamping to carry the upper end of the spindle and to assist in maintaining the position of the transfer pinion carriers associated with the odometer. It has been found, too, that the main frame can readily be made for use with either a fixedly mounted magnet or a rotating magnet.

The cup-shaped main frame 9 has a base 11 and an annular wall 13. From the base there projects axially a shank 15 externally threaded as at 17. The shank is bored out at 19 to provide a rotary bearing for the rotor shaft 21. The frame 9 has a plurality of rearwardly-directed bosses 23 apertured for receiving fastening means 25 by which the frame 9 is clamped to the casing 27. The front opening of the casing is covered by a dial 29 and a glass 31, these parts being held in position by a securing ring 33. From the main frame there also projects a second shank 35 as shown in Fig. 1 and Fig. 5. This shank 35 is apertured to receive the reciprocably and rotatably mounted reset stem 37. The latter is held outwardly in its inoperative position by a spring 39, this spring engaging the end of the shank 35 and a suitable abutment on the stem 37. Within the instrument the stem 37 is provided with a cone 41 and a pinion 43, as usual.

Within the hollow chamber of the frame 9 is an inner shoulder 45 and an outer shoulder 47, these shoulders being circular in form. Upon the shoulder 47 in the form of the invention employing a fixedly-positioned magnet there is placed a C-shaped magnet 49. Within the gap of the magnet is placed a temperature-compensating device 51. This is a stamped piece of the well-known nickel alloy commonly used for this purpose. It is shaped as best shown in Fig. 7, and it is dimensioned to conveniently snap into position between the poles of the magnet.

The main frame has apertured flat faces 53 upon which rest the radial slotted tongues 55 of the spindle frame 57. This spindle frame also rests on ledge 56 and is held by fastening means 59 extending through the slots of the tongues and into the apertures of the faces 53. Under the heads 61 of fastening means 59 are angular clamps 63, the ends of which extend through slots 62 of the spindle frame and engage and hold the magnet 49 on its seat 47.

At 65 is a substantially conventional rotor on the inner end of the rotor shaft 21. The rotor may be conveniently secured in position by forming the shaft with a reduced end and seating the rotor thereon and turning the metal at the end of the shaft over the edge of the rotor. To retain the rotor shaft from moving axially in its bearing a disc 67 suitably secured to the bottom of the cup is engaged in an annular groove 69 in the shaft.

The rotor shaft is terminally recessed to receive a suitable bearing 71 for the end of a spindle 73 extending in the same axial direction as the rotor shaft. A disc 75 of aluminum or the like is secured to the spindle 73 between clamps 77. To provide the other bearing for the spindle 73 the spindle frame 57 is used. Upstanding from its flat base portion 79 is an arm 81 having its end bent at an angle substantially into parallelism with the base portion 79. This arm is apertured as at 85 to carry the bearing 87 for the spindle 73 as shown in Fig. 2. Rotatably surrounding the upper end of this bearing is a tension-adjusting arm 72. One end of the arm 72 is connected to a zero biasing spring 74. The other end of the spring 74 is connected to the spindle 73. The arm 72 extends radially to a position over a bridge portion 76 of a side wall 93 to be referred to below. The arm 72 has a lateral extension 89 which is bent over the end 83 to yieldingly engage the under side thereof, so that the spring adjustment is maintained by the frictional engagement of the arm 72 with the part 83. The spindle 73 extends through the dial plate 29 and to its end there is fixed a pointer 90. This assembly of parts including the disc 75, spindle 73, and the pointer 90 is rotatable under the influence of eddy currents set up in the disc 75 under the influence of the magnet and rotating rotor in a manner well understood. The dial plate will be provided with suitable characters whereby the extent of rotation of the needle may be measured. The rotor shaft is to be connected by means of a flexible cable by some shaft, the rate of rotation of which varies with the rate of travel of the vehicle so that the position of the needle on the dial measures the speed of the vehicle as is usual in such instruments.

The main frame is formed with opposite arms 91 and 93. These arms are substantially parallel and are at right angles to a diameter of the cup. Arm 91 has three vertically-disposed openings 95, 97, 99. Arm 93 has apertures 101 and 103. The apertures 95 and 101 register for the support of a shaft 105. This shaft carries a series of odometer wheels 107 of which the right-hand wheel 107' may be a wheel without characters. The wheel 107' is formed rigidly with a worm 109 and a gear 111. Between each two adjacent odometer wheels 107 is a disc 113 carrying a transfer pinion 115 whereby the next higher denomination wheel is driven by the wheel of next lower denomination. Each disc 113 has a radial extension 117 entering a slot 119 in the base 79 of the spindle frame 57. In this way the discs 113 are held from rotation to the end that the transfer pinions may function as intended. A gear 121 is rotatably supported by a pin carried in opening 97. This gear 121 engages gear 111 as shown in Fig. 1. Gear 121 also engages a gear 123 rotatable about the axis of a shaft 125 supported in openings 99 and 103. Rotatable about the axis of shaft 125 are other figure wheels 127, these wheels constituting the so-called trip set. These wheels also are separated by discs 113 as in the case of the first set of wheels. The discs 113 as before are for the purpose of carrying transfer pinions and are held from rotation by radial extensions 117 entering a slot of the spindle frame, this slot like the other being represented by numeral 119. Adjacent gear 123 and rigid therewith is a gear 129. A conical member 131 is rigid with the gears 123 and 129, and the cone and gears are connected by a sleeve 130. This assembly is at all times non-rotatably connected to the first of the figure wheels 127 but is slidable on the shaft 125 relatively to the first wheel. The assembly is normally held by a spring 133 toward the right (Fig. 1) so that gear 123 normally meshes with gear 121. The assembly may be moved to the left by an inward reciprocation of stem 37, this movement to the left being effected by the engagement of parts 41 and 131. After being so moved the gear 129 is engaged by the pinion 43 and rotation of stem 37 will then function to rotate the wheels of the trip set. Clips 132 engage over the arm 93 adjacent the ends of the shafts 105 and 125. They enter grooves 134 and engage the shafts, serving to hold them against reciprocation.

The odometer is normally driven by a plurality of shafts rotatably supported in the main frame 9. The series of shafts takes the power from the rotor shaft and delivers it to gear 109 of the season set of wheels whereupon the gears 111, 121, and 123 transmit the drive to the trip set of wheels. Adjacent the junction of the base of the cup of the main frame and the shank 15, the frame is provided with a bore 135 through which extends the second worm shaft 137 driven by the first worm 139 on the rotor shaft. This second worm shaft 137 is geared to a third worm shaft 141 supported in bearings 143 and 145. This third worm shaft 141 engages the so-called fourth worm, the gear 109 which is rigid with wheel 107'.

The apertures 147 and 149 in lugs 151 and 153 respectively are to receive rivets 155 securing retaining means 157 to prevent axial movement of the shafts 137 and 141.

Preferably there will be used an angular calibrating member 159 in the form of the invention employing the fixedly-mounted magnet. This angular calibrating member 159 is pivoted to the main frame at 161 for rotation to adjustably position an arm of this member relatively to the magnet poles. As seen in Fig. 1 this arm extends under the bridge portion 76 which connects the end portions of the wall 93. The stamped spindle frame is recessed as at 160 to accommodate the necessary movements of this calibrating arm.

Fig. 8 shows how the main frame may be employed without change for use with a rotating magnet. In this case a bar magnet 165 is provided with up-turned ends as shown. The middle point of the bar is secured to the end of the rotor shaft 21' which extends through the shank 15 of the main frame 9. An inverted cup-shaped field plate 167 is used to concentrate the influence of the magnet upon the drag disc. The open edge of the cup rests on shoulder 45 and the cup is held in position by fastening means 63' and 59', these parts corresponding in general to 63 and 59 of the form already described. Under the heads of the fastening means 59' is secured the spindle frame 57' corresponding to 57 of Fig. 6. Between the magnet 165 and the cup-shaped field plate 167 is an inverted cup-shaped drag disc 169. This drag disc is secured to a spindle 73'. The mounting of the odometer and the drive for the odometer is substantially as in the form described above. It will therefore be seen that with the two frames—the main frame of Fig. 5 and the stamped frame of Fig. 6—it is easily possible to build the now preferred fixed magnet type of instrument or the rotary magnet type.

The die cast frame is the principal part. It affords the rotary bearing support for the rotor shaft, the mounting mechanism for the magnet of one form and for the cup-shaped field plate of the other form. It supports the odometer shafts and also provides rotary bearing supports for the odometer driving shafts. The so-called spindle frame which is an inexpensive casting functions to hold the outer end of the drag disc spindle and, by means of slots, to restrain the transfer pinion carriers from movement from their operative positions.

I claim:

1. In a magnetic measuring device, a main frame having an axial passage for a rotor shaft and a shoulder to support a magnet, a rotor shaft, a magnet supported on said shoulder, said main frame having an axial wall with an aperture therethrough, a second frame having a flat base and an upwardly and inwardly directed part to overlie the axis of the rotor shaft, fastening means to clamp said frame in assembled relation and to hold the magnet on the supporting shoulder, and a calibrating member hinged to said axial wall and extending through said aperture in the axial wall to a position adjacent the poles of the magnet.

2. The invention defined by claim 1 together with a resilient thermo-sensitive compensator held by its own resiliency between the poles of the magnet.

RALPH O. HELGEBY.